(12) United States Patent
Huang et al.

(10) Patent No.: US 11,716,544 B2
(45) Date of Patent: Aug. 1, 2023

(54) IMAGE CAPTURE MODULE AND ELECTRONIC TERMINAL

(71) Applicant: Huawei Technologies Co., Ltd., Shenzhen (CN)

(72) Inventors: Bo Huang, Shanghai (CN); Peng Zha, Shanghai (CN); Weihua Mao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 17/599,835

(22) PCT Filed: Mar. 27, 2020

(86) PCT No.: PCT/CN2020/081619
§ 371 (c)(1),
(2) Date: Sep. 29, 2021

(87) PCT Pub. No.: WO2020/200077
PCT Pub. Date: Oct. 8, 2020

(65) Prior Publication Data
US 2022/0166922 A1    May 26, 2022

(30) Foreign Application Priority Data
Mar. 29, 2019    (CN) .......................... 201910250721.0

(51) Int. Cl.
*H04N 23/60* (2023.01)
*H04N 23/957* (2023.01)
(Continued)

(52) U.S. Cl.
CPC ............. *H04N 23/80* (2023.01); *H04N 23/57* (2023.01); *H04N 23/65* (2023.01); *H04N 23/665* (2023.01); *H04N 23/957* (2023.01)

(58) Field of Classification Search
CPC ............. H04N 5/2253; H04N 5/22541; H04N 5/2257; H04N 5/2258; H04N 5/23209;
(Continued)

(56) References Cited

U.S. PATENT DOCUMENTS

2004/0021792 A1    2/2004    Yasui
2004/0075741 A1*   4/2004    Berkey ............ G08B 13/19641
                                                        348/E7.086
(Continued)

FOREIGN PATENT DOCUMENTS

CN    202679454 U    1/2013
CN    203136054 U    8/2013
(Continued)

*Primary Examiner* — Paul M Berardesca
(74) *Attorney, Agent, or Firm* — Conley Rose, P.C.

(57) ABSTRACT

A device includes at least one camera, a transmitter, and a main controller. The at least one camera is configured to collect an image and obtain an image signal. The transmitter includes a first signal end and a second signal end. The first signal end includes a first quantity of connection channels electrically connected to the photographing module, and the second signal end includes a second quantity of connection channels electrically connected to the main controller. The first quantity is greater than the second quantity. The image signal is transmitted from the first signal end to the second signal end. The main controller module is configured to receive and process the image signal.

20 Claims, 4 Drawing Sheets

(51) Int. Cl.
*H04N 23/57* (2023.01)
*H04N 23/80* (2023.01)
*H04N 23/65* (2023.01)

(58) Field of Classification Search
CPC .... H04N 5/23227; H04N 5/247; H04N 23/45;
H04N 23/54; H04N 23/57; H04N 23/663;
H04N 23/665; H04N 23/80; H04N 23/90;
H04N 23/957; H04N 5/38–62; H04N
5/765–7755
See application file for complete search history.

(56) References Cited

U.S. PATENT DOCUMENTS

| | | | |
|---|---|---|---|
| 2006/0238826 A1 | 10/2006 | Itou et al. | |
| 2014/0146187 A1* | 5/2014 | Ju | G06F 1/3278 348/207.1 |
| 2015/0245042 A1 | 8/2015 | Thompson | |
| 2016/0360141 A1 | 12/2016 | Koike-Akino et al. | |
| 2018/0139373 A1 | 5/2018 | Kimata | |
| 2019/0130550 A1* | 5/2019 | Mitsubayashi | G06T 5/50 |
| 2020/0412996 A1 | 12/2020 | Ma et al. | |
| 2022/0224830 A1* | 7/2022 | Oku | H04N 23/951 |

FOREIGN PATENT DOCUMENTS

| | | |
|---|---|---|
| CN | 103974040 A | 8/2014 |
| CN | 203813894 U | 9/2014 |
| CN | 204517922 U | 7/2015 |
| CN | 205566472 U | 9/2016 |
| CN | 106031168 A | 10/2016 |
| CN | 106713540 A | 5/2017 |
| CN | 107155041 A | 9/2017 |
| CN | 206878879 U | 1/2018 |
| CN | 207053648 U | 2/2018 |
| CN | 110326283 A | 10/2019 |

* cited by examiner

IMAGE CAPTURE MODULE AND ELECTRONIC TERMINAL

CROSS-REFERENCE TO RELATED APPLICATIONS

This application is a U.S. National Stage of International Patent Application No. PCT/CN2020/081619 filed on Mar. 27, 2020, which claims priority to Chinese Patent Application No. 201910250721.0 filed on Mar. 29, 2019. Both of the aforementioned applications are hereby incorporated by reference in their entireties.

TECHNICAL FIELD

Embodiments of this application relate to the field of image processing technologies, and in particular, to an image capture module and an electronic terminal.

BACKGROUND

As image quality requirements of users increase, an electronic terminal generally collects images by using a plurality of cameras at the same time or by using a high-definition camera, to achieve a better photographing effect. However, this causes an increase in connection cables between a camera module and an image processing module. Consequently, occupied board space of a circuit board is affected.

SUMMARY

To resolve the foregoing technical problem, the present invention provides an image capture module and an electronic terminal, to reduce impact on occupied board space of a circuit board.

An embodiment of the present invention provides an image capture module, including a photographing module, a transmission module, and a main control module. The photographing module includes at least one camera, configured to collect an image and obtain an image signal. The transmission module is electrically connected between the photographing module and the main control module to transmit the image signal, and the main control module is configured to receive and process the image signal. The transmission module includes a first signal end and a second signal end. The first signal end includes a first quantity of connection channels electrically connected to the photographing module, and the second signal end includes a second quantity of connection channels electrically connected to the main control module. The first quantity is greater than the second quantity. The image signal is transmitted from the first signal end to the second signal end after data amount reduction processing is performed by the transmission module.

The quantity of connection channels that are of the transmission module and that are electrically connected to the main control module is less than the quantity of connection channels that are of the transmission module and that are electrically connected to the photographing module. Therefore, a quantity of connection cables between the transmission module and the main control module is accordingly reduced. In this way, complexity of cabling between the photographing module and the main control module can be reduced, and more cabling space can be provided.

In an optional embodiment, the transmission module and the photographing module are located in a first circuit module, the main control module is located in a second circuit module, and the first circuit module and the second circuit module are disposed independently of each other. In this way, a position at which the main control module is disposed can be independent of the photographing module, and the main control module and the photographing module do not need to be disposed on a same circuit board, so that a volume of the image capture module is effectively reduced.

In an optional embodiment, the data amount reduction processing performed by the transmission module includes time division transmission performed for the image signal or compression performed for the image data. Because the transmission module performs data aggregation compression or time division transmission for the image signal to reduce a data amount, the transmission module can transmit the image signal by using fewer connection channels.

The image signal includes image data and an auxiliary signal. The main control module includes a third signal end, a transceiver unit, and a data processing module. The third signal end is electrically connected to the second signal end, and is configured to receive the image signal provided by the transmission module. The receiving unit performs recovery and synchronization for the image data received in a time division manner, or performs decompression for the compressed image data. The data processing module receives and processes the image data based on the auxiliary signal. The receiving and processing the image data includes that the data processing module executes, based on a strobe signal, a field signal, and a clock signal in the auxiliary signal, data required for recognizing one frame of picture in the image data, and then performs processing such as data buffering based on a display resolution. The image signal processed by the data processing module is provided for another function module for use, for example, provided for a display module to perform image display, or provided for a storage module to perform image storage.

The data processing module outputs a control signal based on a user instruction received from the outside, or directly based on the processed image data, and transmits the control signal to the photographing module by using the transmission module. In this embodiment of the present invention, the data processing module further transmits the control signal to the photographing module by sequentially using the transceiver unit, the third signal end, and the transmission module, and the control signal is used to control a working status of the photographing module. Based on the control signal, the photographing module performs a corresponding image collection operation, including adjusting a focal length, focusing, adjusting a photographing angle, and the like based on the control signal.

In an optional embodiment, the transmission module includes a first transmission unit and a second transmission unit. The first transmission unit is configured to process and transmit image data in the image signal, and the second transmission unit is configured to process and transmit an auxiliary signal in the image signal and a control signal that is corresponding to the photographing module and that is provided by the main control unit. The first transmission unit performs time division transmission or compression for the auxiliary signal to reduce a data amount of the image signal, and the second transmission unit performs time division transmission or compression for the image data to reduce the data amount of the image signal. Correspondingly, the transceiver unit includes a first transceiver subunit and a second transceiver subunit. The first transceiver subunit is configured to: perform recovery and synchronization for the image data received in a time division manner, or perform decompression for the compressed auxiliary signal. The second transceiver subunit is electrically connected to the wireless receiving unit, and is configured to: perform recovery and synchronization for the image data received in the time division manner, or perform decompression for the compressed image data.

Because the image signal and the auxiliary signal are separately transmitted, high-speed transmission can be performed for the image data, so that it can be effectively ensured that the image data with a large data amount is not affected by the auxiliary signal, and fast transmission can be performed for the image data with a large data amount collected in the photographing module.

In an optional embodiment, the first signal end includes a first channel group and a second channel group. The first transmission unit is electrically connected to the photographing module by using the first channel group, to receive and transmit the auxiliary signal and the control signal. The first channel group includes a third quantity of connection channels. The second signal end includes a third channel group, the third channel includes a fourth quantity of connection channels, and the fourth quantity is less than the second quantity. The third signal end includes a fifth channel group, the fifth channel group includes a fourth quantity of connection channels, and the fifth channel group and the third channel group are electrically connected in a flat cable or board-to-board connection manner, to transmit the auxiliary signal and the control signal to the first transceiver unit in a wired manner.

The second transmission unit is electrically connected to the photographing module by using the second channel group, to receive the image data by using the second channel group. The second channel group includes a fifth quantity of connection channels. A sum of the third quantity and the fifth quantity is the first quantity. The transmission module includes a wireless transmitting unit, and the wireless transmitting unit is electrically connected to the second transmission unit, and is configured to transmit the image data in a wireless light wave manner or a radio wave manner. Correspondingly, the main control module includes a wireless receiving unit and a transceiver unit that are electrically connected, and the wireless transmitting unit is configured to: receive a radio broadcast or a radio wave transmitted by the wireless transmitting unit, and obtain the image data from the wireless light wave or the radio wave.

The wireless transmitting unit and the wireless receiving unit are connected in a wireless manner. Therefore, a layout problem of a physical cable between the wireless transmitting unit and the wireless receiving unit is fully considered. In addition, because the wireless transmitting unit and the wireless receiving unit are not directly connected by using a cable, positions of the wireless transmitting unit and the wireless receiving unit are relatively flexible, and more cabling space is provided. In addition, in this embodiment, a physical distance between the wireless transmitting unit and the wireless receiving unit is 1 to 2 millimeters, so that cabling is simple, and fast transmission of the image data can be ensured.

In an optional embodiment, the wireless transmitting unit and the second transmission unit may alternatively be disposed in a form of an integrated circuit in the transmission module, to further reduce connection channels between the wireless transmitting unit and the wireless receiving unit, thereby providing more cabling space.

In an optional embodiment, the second signal end further includes a fourth channel group, and the third signal end includes a sixth channel group. The fourth signal channel group and the sixth channel group include a sixth quantity of connection channels, and are electrically connected in a flat cable or board-to-board connection manner. In other words, the second transmission unit transmits the image data to the second transceiver subunit by using fewer transmission channels in a wired manner.

Further, the main control module further includes a power supply module, and the power supply module is electrically connected to the photographing module by using a power cable, to provide a drive voltage for the photographing module, thereby ensuring normal working of the photographing module.

An optional embodiment further provides an electronic terminal, including the foregoing image capture module and other function modules, for example, a sound collection module, a display module, and an operation module. Because connection channels in the image capture module are reduced, the cabling space is larger, and cabling design is more flexible. In addition, a volume of the image capture module has reduced space, to meet requirements of simple internal cabling and overall lightening and thinning of the electronic terminal.

DESCRIPTION OF EMBODIMENTS

The following describes the present invention by using specific embodiments.

Figure 1:
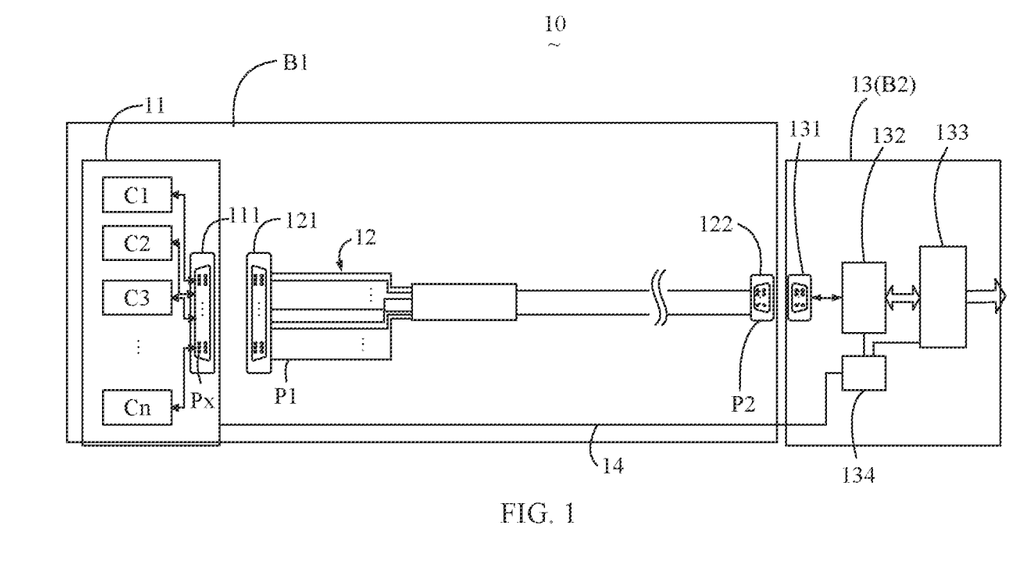
FIG. 1 is a functional block diagram of an image capture module according to a first embodiment of this application.

FIG. 1 is a functional block diagram of an image capture module according to a first embodiment of this application. As shown in FIG. 1, an image capture module 10 includes a photographing module 11, a transmission module 12, and a main control module 13. The transmission module 12 is electrically connected to the photographing module 11 and the main control module 13, and the photographing module 11 and the main control module 13 perform data exchange by using the transmission module 12. It should be noted that in this application, the electrical connection is a connection performed by using a conductive wire or a conductive element, and transmission of conductive particles (electrons) can be performed.

In this embodiment of the present invention, the photographing module 11 is configured to: collect an external image, obtain a corresponding image signal, and transmit the image signal to the transmission module 12. The transmission module 12 performs data aggregation compression for the image signal to reduce a data amount, and then transmits the image signal to the main control module 13. The transmission module 12 is further configured to transmit, to the photographing module 11, a control signal provided by the main control module 13. Based on the control signal, the photographing module 11 performs a corresponding image collection operation, for example, adjusting a focal length, focusing, and adjusting a photographing angle based on the control signal. In this embodiment of the present invention, the image signal is transmitted to the main control module 13 for data processing, and is provided for another function module for use, for example, provided for a display module (not shown in the figure) to perform image display, or provided for a storage module (not shown in the figure) to perform image storage.

Specifically, the transmission module 12 includes a first signal end 121 and a second signal end 122 electrically connected to the first signal end 121. The first signal end 121 is electrically connected to the photographing module 11, so that the photographing module 11 and the transmission module 12 are electrically connected and perform data exchange. In other words, the photographing module 11 performs data transmission with the transmission module 12 by using the first signal end 121. The second signal end 122 is electrically connected to the main control module 13, so that the transmission module 12 and the main control module 13 are electrically connected and perform data exchange. In other words, the main control module 13 performs data transmission with the transmission module 12 by using the second signal end 122.

The first signal end 121 includes a first quantity of connection channels P1 electrically connected to the photographing module 11, and the second signal end 122 includes a second quantity of connection channels P2 electrically connected to the main control module 13. The transmission module 12 performs data aggregation compression for the image signal to reduce a data amount, and then transmits the image signal to the main control module 13. Therefore, the first quantity is greater than the second quantity. That is, a quantity of connection channels P1 included in the first signal end 121 is greater than a quantity of connection channels P2 included in the second signal end 121. Specifically, the photographing module 11 transmits the obtained image signal to the transmission module 12 by using the first signal end 121. The transmission module 12 outputs the image signal to the main control module 13 by using the second signal end 122, after performing aggregation compression processing for the image signal to reduce a data amount, for example, after performing processing in a manner such as time division transmission or data compression to reduce an amount of data that needs to be transmitted in a unit time.

The quantity of connection channels P2 in the second signal end 122 that is of the transmission module 12 and that is electrically connected to the main control module 13 is less than the quantity of connection channels P1 in the first signal end 121 that is of the transmission module 12 and that is electrically connected to the photographing module 11. Therefore, the quantity of connection channels P2 between the transmission module 12 and the main control module 13 is accordingly reduced, compared with connection channels P1 for outputting the image signal by the photographing module 11. In this way, complexity of cabling between the photographing module 11 and the main control module 13 is effectively reduced, and more cabling space can be provided.

More specifically, the photographing module 11 includes at least one camera C and a signal port 111. In this embodiment, the photographing module 11 includes n cameras C1, C2, C3, . . . , and Cn, and n is a natural number greater than or equal to 1. Each camera C is configured to collect an image of an environment in which the camera C is located and obtain corresponding image data. Image data collected by the cameras C1 to Cn and a corresponding auxiliary signal constitute the image signal. In this embodiment, the auxiliary signal includes a strobe signal, a field signal, a clock signal, a synchronization signal, or a reset signal. In this embodiment, the photographing module 11 can further provide sound collection in cooperation with the current image, and a collected sound signal is included in the image signal.

The signal port 111 is electrically connected between the plurality of cameras C1 to Cn and the first signal end 121 of the transmission module 12, and the photographing module 11 transmits the image signal to the first signal end 121 by using the signal port 111. In this embodiment of the present invention, the signal port 111 includes a first quantity of terminals Px, and each terminal Px is electrically connected to one connection channel P1 in the first signal port 121.

In this embodiment, the first signal end 121 is electrically connected to the signal port Px by using a flexible flat cable or a board-to-board (Board to Board, BTB) connector.

The transmission module 12 performs time division transmission for the image signal or performs aggregation compression processing in a manner such as image data compression for the image data to reduce a data amount of the image signal. In this way, the image signal can be transmitted to the main control module 13 by using the second signal end 122 whose quantity is less than the quantity of connection channels P1 of the first signal end 121.

The time division transmission is to divide the image signal into a plurality of parts and transmit the plurality of parts in different time segments under a time division control signal, to reduce an amount of data transmitted in a same time segment. Image data compression is to reduce the data amount by mainly using coding compression, and a coding scheme includes Huffman coding, run-length encoding, arithmetic coding, discrete cosine transform coding, or hybrid coding. The data amount of the image data is reduced in a manner of time division transmission or image data compression, so that the compressed data amount is transmitted by using the second quantity of connection channels P2 matched with the compressed data amount, thereby ensuring fast and correct transmission of the data.

In this embodiment, the transmission module 12 may use a field-programmable gate array (Field-Programmable Gate Array, FPGA) or another generic logic array (Programmable Logic Array, GAL). In addition, the transmission module 12 may be electrically connected to the first signal end 121 and the second signal end 122 by using a flat cable, to perform data transmission.

In this embodiment of the present invention, the main control module 13 includes a third signal end 131, a transceiver unit 132, a data processing module 133, and a power supply module 134. The third signal end 131 is electrically connected to the transceiver unit 132, the transceiver unit 132 is electrically connected to the data module 133, and the power supply module 134 is electrically connected to the transceiver unit 132 and the data processing module 133.

The third signal end 131 is electrically connected to the second signal end 122, and is configured to receive the image signal transmitted by the transmission module 12 and transmit the image signal to the transceiver unit 132. In addition, the main control module 13 sends the control signal to the transmission module 12 by using the third signal end 131.

In this embodiment, the third signal end 131 and the second signal end 122 are electrically connected in a wired connection manner, and a specific connection manner includes a flexible flat cable or a board-to-board connector.

The transceiver unit 132 performs restoration processing for the image signal provided from the third signal end 131, including performing recovery and synchronization for the image data and the auxiliary signal that are received in a time division manner, or performing decompression for the compressed image data. That is, the transceiver unit 132 synchronously combines, based on a time division mark and a time sequence of reception, the image data received in the time division manner, to restore formats and data amounts of the image data and the auxiliary signal in the original image signal sent by the photographing module 11; or performs decoding based on a coding format used for the compression, to restore formats and data amounts of the image data and the auxiliary signal in the original image signal sent by the photographing module 11.

The data processing module 133 is electrically connected to the transceiver unit 132, and is configured to receive and process the image data based on the auxiliary signal. Specifically, the receiving and processing the image data is that the data module 133 executes, based on a strobe signal, a field signal, and a clock signal in the auxiliary signal, data required for recognizing one frame of picture in the image data, and then performs processing such as data buffering based on a display resolution. In addition, the data processing module 133 outputs a control signal based on a user instruction received from the outside, or directly based on the processed image data, and transmits the control signal to the photographing module 11 by using the transmission module 12.

The power supply module 134 is configured to provide a drive power supply for a function unit module of the main control module 13. For example, the power supply module 134 is electrically connected to both the transceiver unit 132 and the data processing module 133, and is configured to provide a working power supply for the transceiver unit 132 and the data processing module 133. The power supply module 134 is further electrically connected to the photographing module 11 by using a power cable 14, to provide a drive power supply for working of each camera C in the photographing module 11.

In this embodiment of the present invention, during specific structural design of each function module in the image capture module 10, the photographing module 11 and the transmission module 12 are located in a first circuit module B1, the main control module 13 is located in a second circuit module B2, and the first circuit module B1 is independent of the second circuit module B2. In this embodiment, the first circuit module B1 and the second circuit module B2 are circuit boards (Circuit Board) that are independent of each other.

Figure 2:
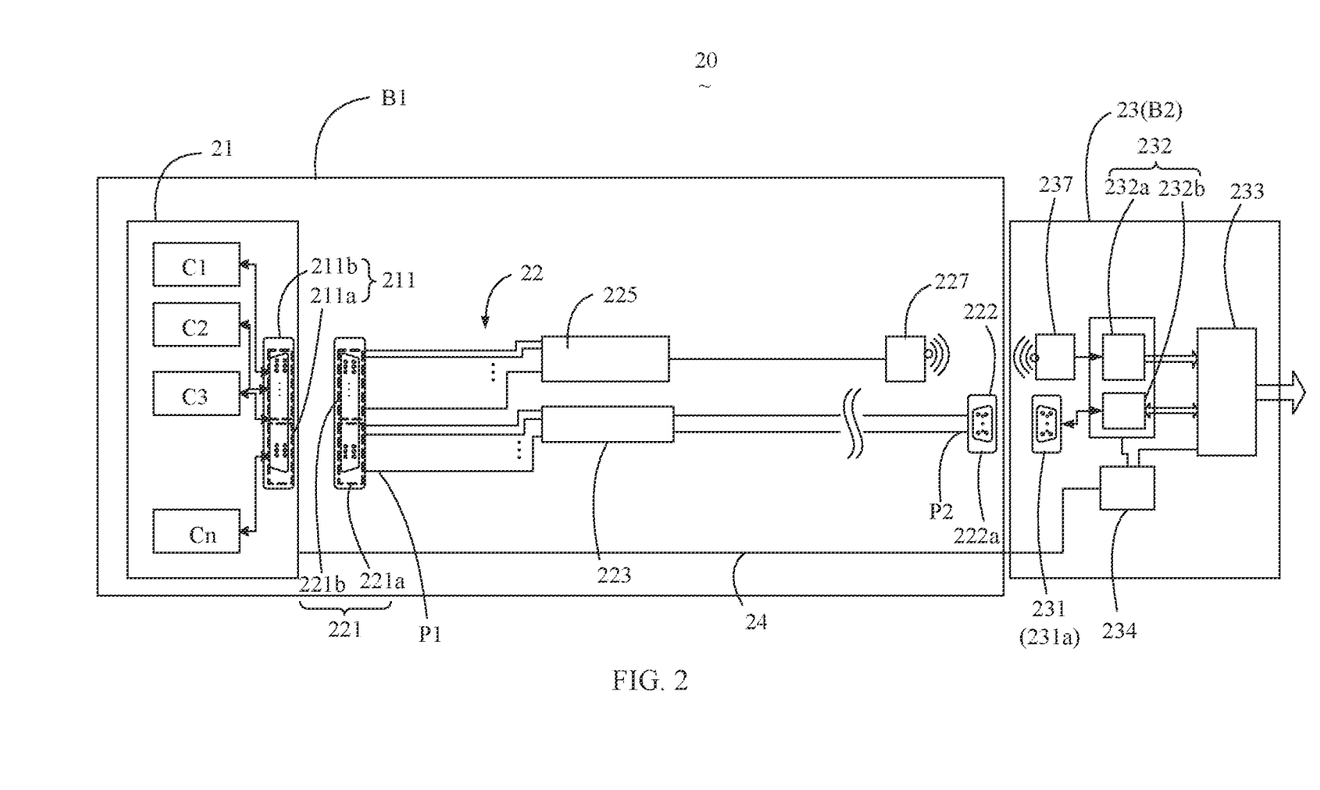
FIG. 2 is a functional block diagram of an image capture module according to a second embodiment of this application.

FIG. 2 is a functional block diagram of an image capture module according to a second embodiment of this application. As shown in FIG. 2, an image capture module 20 includes a photographing module 21, a transmission module 22, and a main control module 33. The transmission module 22 is electrically connected to the photographing module 21 and the main control module 23, and the photographing module 21 and the main control module 23 perform data exchange by using the transmission module 22.

The photographing module 21 is configured to collect an external image and obtain a corresponding image signal. The transmission module 22 is electrically connected to the photographing module 21 and the main control module 23, and the photographing module 21 and the main control module 23 perform data exchange by using the transmission module 22.

The transmission module 22 performs data aggregation compression for the image signal to reduce a data amount of the image signal, and then transmits the image signal to the main control module 23. In addition, the transmission module 22 transmits a control signal provided by the main control module 23 to the photographing module 21. The image signal is transmitted to the main control module 23 for data processing, and is provided for another function module for use. Based on the control signal, the photographing module 21 may perform different image collection operations, for example, adjusting a focal length, focusing, and adjusting a photographing angle.

Specifically, the transmission module 22 includes a first signal end 221 and a second signal end 222. The first signal end 221 is electrically connected to the photographing module 21, so that the photographing module 21 and the transmission module 22 are electrically connected and perform transmission for data exchange. The second signal end 222 is electrically connected to the main control module 23, so that the transmission module 22 and the main control module 23 are electrically connected and perform transmission for data exchange.

The first signal end 221 includes a first quantity of connection channels P1 electrically connected to the photographing module 21, and the second signal end 122 includes a second quantity of connection channels P2 electrically connected to the main control module 23. The first quantity is greater than the second quantity. The transmission module 22 performs data aggregation compression for the image signal to reduce a data amount, and then transmits the image signal to the main control module 23. That is, the quantity of connection channels P2 between the transmission module 22 and the main control module 23 is less than the quantity of connection channels P1 for outputting the image signal by the photographing module 21. Therefore, more cabling space can be provided between the transmission module 22 and the main control module 23, thereby reducing cabling complexity.

More specifically, the photographing module 21 includes at least one camera C and a signal port 211. In this embodiment, the photographing module 21 includes n cameras C1 to Cn, and n is a natural number greater than or equal to 1. Each camera C is configured to collect an image of an environment in which the camera C is located and obtain image data. Image data collected by the cameras C1 to Cn and a corresponding auxiliary signal constitute the image signal. In this embodiment, the auxiliary signal includes a strobe signal, a field signal, a clock signal, a synchronization signal, or a reset signal.

The signal port 211 includes a first port group 211a and a second port group 211b. The first port group 211a is configured to output the auxiliary signal and receive the control signal. The second port group 211b is configured to output the image data. The first port group 211a includes a third quantity of terminals, and the second port group 211b includes a fifth quantity of terminals.

The transmission module 22 performs time division transmission for the image signal or performs compression or the like in an aggregation compression manner for the image data to reduce a data amount of the image signal.

The transmission module 22 includes a first transmission unit 223, a second transmission unit 225, and a wireless transmit module 227. The first transmission unit 223 is configured to: process and output the auxiliary signal, receive the control signal provided by the main control module 23, and transmit the control signal to the photographing module 21. The second transmission unit 225 is configured to transmit the image data in the image signal. The wireless transmit module 227 is electrically connected to the second transmission unit 225, and is configured to transmit the image data in a wireless transmission manner.

The first transmission unit 223 and the second transmission unit 225 perform aggregation compression for the image data and the auxiliary signal separately to reduce the data amount. A used aggregation compression manner includes time division transmission, image data compression, or the like. Specifically, the time division transmission manner is to divide the image signal into a plurality of parts and transmit the plurality of parts in different time segments under a time division control signal, to reduce an amount of data transmitted in a same time segment. The image data compression manner is to reduce the data amount by mainly using coding compression, and a coding scheme includes a coding compression manner such as Huffman coding, run-length encoding, arithmetic coding, discrete cosine transform coding, or hybrid coding manner.

In this embodiment, the first transmission unit 223 and the second transmission unit 225 may use a field-programmable gate array FPGA or another generic logic array GAL.

The first signal end 221 includes a first channel group 221a and a second channel group 221b, and the second signal end 222 includes a third channel group 222a. The first channel group 221a includes a third quantity of connection channels, the third channel group 222a includes a fourth quantity of connection channels, and the third quantity is greater than the fourth quantity. The second channel group 221b includes a fifth quantity of connection channels. A sum of the third quantity and the fifth quantity is the first quantity, and the fourth quantity is less than the second quantity.

The first transmission unit 223 is electrically connected to the first port group 211a of the photographing module 211 by using the first channel group 221a, and receives the auxiliary signal from the first port group 211a. In addition, the first transmission unit 223 performs time division transmission, data compression, or the like in an aggregation compression manner for the auxiliary signal to reduce the data amount, and then outputs the auxiliary signal by using the third channel group 222a; and receives, from the third channel group 222a, the control signal provided by the main control module 23, and then outputs the control signal to the photographing module 21 by using the first channel group 221a. In this embodiment, the first transmission unit 223 is electrically connected to the first channel group 221a and the third channel group 222a by using a flat cable, and performs data transmission.

The second transmission unit 225 is electrically connected to the second port group 211b of the photographing module 21 by using the second channel group 221b, and receives the image data from the second port group 211b. In addition, the second transmission unit 225 performs time division transmission or data compression for the image data.

In this embodiment, the second transmission unit 225 performs high-speed transmission for the image data, for example, a data rate is above 1 Gpbs. The first transmission unit 223 performs low-speed or high-speed transmission for the auxiliary signal. Separate transmission of the image data and the auxiliary data can effectively ensure that the image data with a large data amount is not affected by the auxiliary signal, and fast transmission can be performed for the image data with a large data amount simultaneously collected by a plurality of cameras C in the photographing module 21.

The wireless transmit module 227 transmits the image data in the wireless light wave manner or the radio wave manner.

The main control module 23 includes a third signal end 231, a transceiver unit 232, a data processing module 233, a power supply module 234, and a wireless receiving unit 237. Both the third signal end 231 and the transceiver unit 232 are electrically connected to the data processing module 233, and the wireless receiving unit 237 is electrically connected to the transceiver unit 232.

The third signal end 231 includes a fifth channel group 231a, and the fifth channel group 231a includes a fourth quantity of connection channels (not marked) for electrically connecting to the connection channels in the third channel group 222a in a one-to-one correspondence manner, and receives the auxiliary signal from the third channel group 222a.

In this embodiment, the fifth channel group 231a in the third signal end 131 and the third channel group 222a are electrically connected in a wired connection manner, and a specific connection manner includes a flexible flat cable or a board-to-board connector.

The wireless receiving unit 237 performs signal transmission with the wireless transmitting unit 227 in a wireless manner. The wireless manner includes a manner of transmitting a signal by using a wireless light wave or a radio wave. That is, the signal is loaded to the wireless light wave or the radio wave, and data transmission is performed by using the wireless light wave or the radio wave as a carrier. Therefore, the wireless receiving unit 237 may receive, by using the wireless light wave or the radio wave, the image data transmitted by the wireless transmitting unit 227.

In this embodiment, the wireless transmitting unit 227 and the wireless receiving unit 237 are connected in a wireless manner. Therefore, a layout problem of a physical cable between the wireless transmitting unit 227 and the wireless receiving unit 237 is fully considered. In addition, because the wireless transmitting unit 227 and the wireless receiving unit 237 are not directly connected by using a cable, positions of the wireless transmitting unit 227 and the wireless receiving unit 237 are relatively flexible, and more cabling space can be provided. In addition, in this embodiment, a distance between the wireless transmitting unit 227 and the wireless receiving unit 237 is 1 to 2 millimeters, so that cabling is simple, and high-speed transmission of the image data can be ensured.

The transceiver unit 232 obtains, from the wireless receiving unit 237, the image signal transmitted in a wireless manner, and performs recovery and synchronization for the image data received in a time division manner, or performs decompression for the compressed image data. In addition, the transceiver unit 232 receives the auxiliary signal from the fifth channel group 231a, or outputs the control signal to the third signal end 231.

In this embodiment, the transceiver unit 232 includes a first transceiver subunit 232a and a second transceiver subunit 232b.

The first transceiver subunit 232a is electrically connected to the fifth channel group 231a, to be electrically connected to the first transmission unit 233, to transmit the auxiliary signal and the control signal. The first transceiver subunit 232a performs recovery and synchronization for the auxiliary signal and the image data received in the time division manner, or performs decompression for the compressed auxiliary signal. In addition, the first transceiver subunit 232a further transmits the control signal to the photographing module 21 directly by using the fifth channel group 231a.

The second transceiver subunit 232b is electrically connected to the wireless receiving unit 237, to perform recovery and synchronization for the image data received in the time division manner, or performs decompression for the compressed image data.

The data processing module 233 is electrically connected to the first transceiver subunit 232a and the second transceiver subunit 232b in the transceiver unit 232, receives and processes the image data based on the auxiliary signal, and outputs the control signal to the transmission module 22 and the photographing module 21 based on a user instruction received from the outside or directly based on the processed image data.

The power supply module 234 is configured to provide a drive power supply for a function unit module of the main control module 23, and is electrically connected to the photographing module 21 by using a power cable 24, to provide a drive power supply for working of each camera C in the photographing module 21.

In an embodiment of this application, the photographing module 21 and the transmission module 22 are located in a first circuit module B1, the main control module 23 is located in a second circuit module B2, and the first circuit module B1 is independent of the second circuit module B2. In this embodiment, the first circuit module B1 and the second circuit module B2 are circuit boards that are independent of each other.

In a variation embodiment of this application, the wireless transmitting unit 227 and the second transmission unit 237 may alternatively be disposed in a form of an integrated circuit in the transmission module, to further reduce connection channels between the wireless transmitting unit and the wireless receiving unit, thereby providing more cabling space.

In another variation embodiment of this application, the first transmission unit 223 and a channel group in a corresponding signal end are configured to transmit low-speed data, and the second transmission unit 225 is configured to transmit high-speed data. The low-speed data is a data signal whose data transmission rate is at an Mbps level, for example, a synchronization signal, a field signal, or a reset signal transmitted and processed by using the auxiliary signal. The high-speed data is a data signal whose data transmission rate is at a Gbps level, for example, the image data collected by the photographing module 21.

Figure 3:
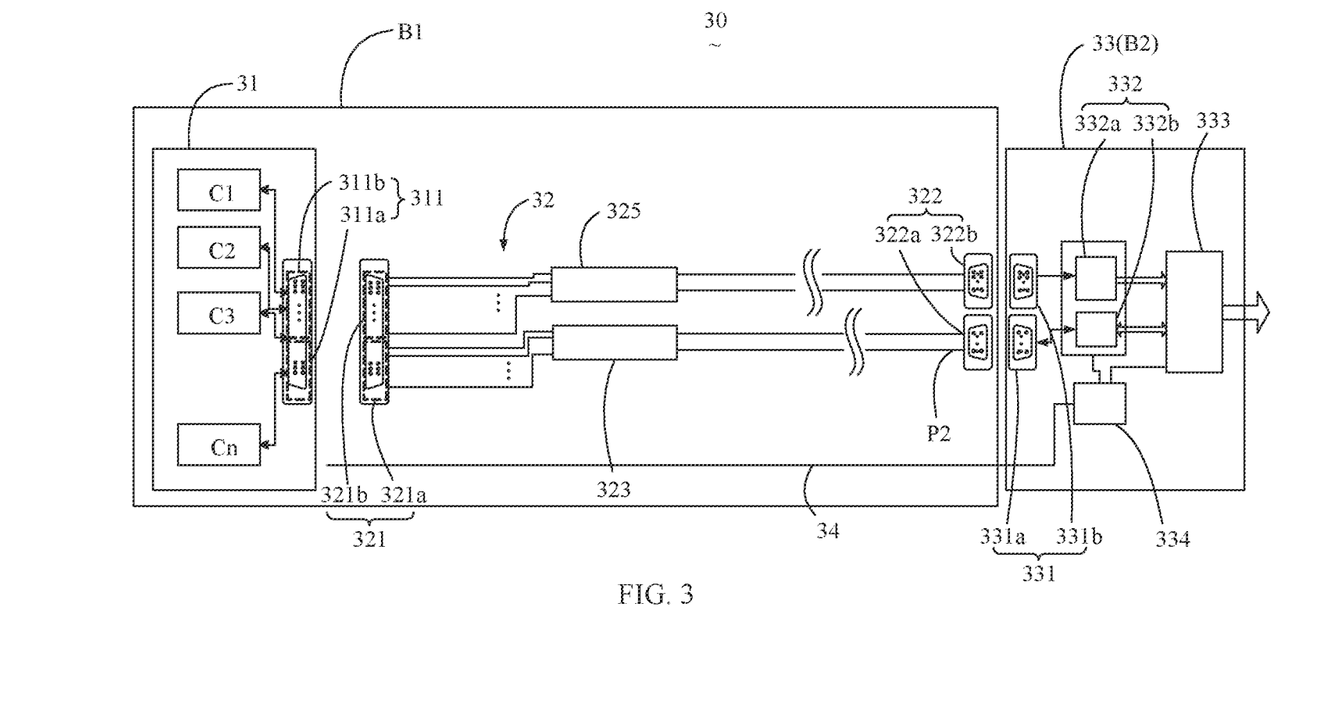
FIG. 3 is a functional block diagram of an image capture module according to a third embodiment of this application.

FIG. 3 is a functional block diagram of an image capture module according to a third embodiment of this application. As shown in FIG. 3, an image capture module 30 includes a photographing module 31, a transmission module 32, and a main control module 33. The transmission module 42 is electrically connected to the photographing module 31 and the main control module 33, and the photographing module 31 and the main control module 33 perform data exchange by using the transmission module 42.

The photographing module 31 is configured to collect an image and obtain an image signal. The transmission module 32 is electrically connected to the photographing module 31 and the main control module 33, and the photographing module 31 and the main control module 33 perform data exchange by using the transmission module 32.

The transmission module 32 performs data aggregation compression for the image signal to reduce a data amount of the image signal, and then transmits the image signal to the main control module 33. In addition, the transmission module 32 transmits a control signal provided by the main control module 33 to the photographing module 31. The image signal is transmitted to the main control module 33 for data processing, and is provided for another function module for use. Based on the control signal, the photographing module 31 may perform different image collection operations.

Specifically, the transmission module 32 includes a first signal end 321 and a second signal end 322. The first signal end 321 is electrically connected to the photographing module 31, so that the photographing module 31 and the transmission module 32 are electrically connected and perform transmission for data exchange. The second signal end 322 is electrically connected to the main control module 33, so that the transmission module 32 and the main control module 33 are electrically connected and perform transmission for data exchange.

The first signal end 321 includes a first quantity of connection channels P1 electrically connected to the photographing module 31, and the second signal end 322 includes a second quantity of connection channels P2 electrically connected to the main control module 33. The first quantity is greater than the second quantity. Therefore, after the image signal obtained by the photographing module 31 is transmitted from the first signal end 321 to the transmission module 32, the image signal is output to the main control module 33 by using the second signal end 321, after data aggregation compression is performed to reduce the data amount.

The quantity of connection channels P2 that are of the transmission module 32 and that are electrically connected to the main control module 33 is less than the quantity of connection channels P1 between the transmission module 32 and the photographing module 31. Therefore, complexity of cabling between the photographing module 31 and the main control module 33 is reduced, and more cabling space can be provided.

More specifically, the photographing module 31 includes at least one camera C and a signal port 311. In this embodiment, the photographing module 31 includes n cameras C1 to Cn. and n is a natural number greater than or equal to 1. Each camera Ci is configured to collect an image of an environment in which the camera C is located and obtain image data, and i is a natural number less than or equal to n. Image data collected by the cameras C1 to Cn and a corresponding auxiliary signal constitute the image signal. In this embodiment, the auxiliary signal includes a strobe signal, a field signal, a clock signal, a synchronization signal, or a reset signal.

The signal port 311 includes a first port group 311a and a second port group 311b. The first port group 311a is configured to output the image data. The second port group 311b is configured to output the auxiliary signal and receive the control signal.

The first port group 311a includes a third quantity of terminals (not marked), and the second port group 311b includes a fifth quantity of terminals (not marked).

The transmission module 32 performs time division transmission for the image signal or performs compression or the like in an aggregation compression manner for the image data to reduce a data amount of the image signal. Specifically, the transmission module 32 includes a first transmission unit 323 and a second transmission unit 325. The first transmission unit 323 is configured to: process and output the auxiliary signal, receive the control signal provided by the main control module 33, and transmit the control signal to the photographing module 31. The second transmission unit 325 is configured to transmit the image data in the image signal.

The first transmission unit 323 and the second transmission unit 325 perform aggregation compression for the image data and the auxiliary signal separately to reduce the data amount. A used aggregation compression manner includes time division transmission, image data compression, or the like. Specifically, the time division transmission manner is to divide the image signal into a plurality of parts and transmit the plurality of parts in different time segments under a time division control signal, to reduce an amount of data transmitted in a same time segment. The image data compression manner is to reduce the data amount by mainly using coding compression, and a coding scheme includes a coding compression manner such as Huffman coding, run-length encoding, arithmetic coding, discrete cosine transform coding, or hybrid coding manner.

In this embodiment, the first transmission unit 323 and the second transmission unit 325 may use a field-programmable gate array FPGA or another generic logic array GAL.

The first signal end 321 includes a first channel group 321a and a second channel group 321b, and the second signal end 322 includes a third channel group 322a and a fourth channel group 322b. The first channel group 321a includes a third quantity of connection channels, the third channel group 322a includes a fourth quantity of connection channels, and the third quantity is greater than the fourth quantity. The second channel group 321b includes a fifth quantity of connection channels, the fourth channel group 322b includes a sixth quantity of connection channels, and the fifth quantity is greater than the sixth quantity. A sum of the third quantity and the fifth quantity is the first quantity, and a sum of the fourth quantity and the sixth quantity is equal to the second quantity.

The first transmission unit 323 is electrically connected to the first port group 311a of the photographing module 311 by using the first channel group 321a, and receives the auxiliary signal from the first port group 3411a. In addition, the first transmission unit 323 performs time division transmission, data compression, or the like in an aggregation compression manner for the auxiliary signal to reduce the data amount, and then outputs the auxiliary signal by using the third channel group 322a; and receives, from the third channel group 322a, the control signal provided by the main control module 33, and then outputs the control signal to the photographing module 31 by using the first channel group 321a.

The second transmission unit 325 is electrically connected to the second port group 311b of the photographing module 31 by using the second channel group 321b, and receives the image data from the second port group 311b. In addition, the second transmission unit 325 performs time division transmission, data compression, or the like in an aggregation compression manner for the image data to reduce the data amount.

The main control module 33 includes a third signal end 331, a transceiver unit 332, a data processing module 333, and a power supply module 334. Both the third signal end 331 and the transceiver unit 332 are electrically connected to the data processing module 333, and the wireless receiving unit 337 is electrically connected to the transceiver unit 332.

The third signal end 331 includes a fifth channel group 331a and a sixth channel group 331b. The fifth channel group 331a includes a fourth quantity of connection channels for electrically connecting to the connection channels in the third channel group 322a in a one-to-one correspondence manner, and receives the auxiliary signal from the third channel group 322a. The sixth channel group 331b includes a sixth quantity of connection channels for electrically connecting to the connection channels in the fourth channel group 322b in a one-to-one correspondence manner.

The fifth channel group 331a and the third channel group 322a are electrically connected in a wired connection manner, the sixth channel group 331b and the fourth channel group 322b are electrically connected in a wired connection manner, and a specific connection manner includes a flexible flat cable or a board-to-board connector.

The transceiver unit 332 is electrically connected to the fifth channel group 331a and the sixth channel group 331b in the third signal end 331, to receive the image data and the auxiliary signal.

The transceiver unit 332 includes a first transceiver subunit 332a and a second transceiver subunit 332b.

The first transceiver subunit 332a is electrically connected to the fifth channel group 331a, to be electrically connected to the first transmission unit 333, to transmit the auxiliary signal and the control signal. The first transceiver subunit 332a performs recovery and synchronization for the auxiliary signal and the image data received in the time division manner, or performs decompression for the compressed auxiliary signal. In addition, the first transceiver subunit 332a further transmits the control signal to the photographing module 31 directly by using the fifth channel group 331a.

The second transceiver subunit 332b is electrically connected to the sixth channel group 331b, to receive the image data that is received in a wireless manner by the wireless receiving unit 337, and perform recovery and synchronization for the image data received in the time division manner, or performs decompression for the compressed image data.

The data processing module 333 is electrically connected to the first transceiver subunit 332a and the second transceiver subunit 332b in the transceiver unit 332, receives and processes the image data based on the auxiliary signal, and outputs the control signal to the transmission module 32 and the photographing module 31 based on a user instruction received from the outside or directly based on the processed image data. The user instruction received from the outside includes outputting the control signal corresponding to an instruction entered by performing a touch operation, a press operation, keyboard input, or another operation, for example, outputting the control signal corresponding to a photographing instruction and a focusing instruction entered by a user. The outputting the control signal based on the processed image data includes outputting the control signal when a data loss, a blurry image, or the like is determined based on the obtained image data, and automatic re-photographing, refocusing, or the like needs to be performed.

The power supply module 334 is configured to provide a drive voltage for a function unit module of the main control module 33, and is electrically connected to the photographing module 31 by using a power cable 34, to provide a drive power supply for working of each camera C in the photographing module 31.

In an embodiment of this application, the photographing module 31 and the transmission module 32 are located in a first circuit module B1, the main control module 33 is located in a second circuit module B2, and the first circuit module B1 is independent of the second circuit module B2. In this embodiment, the first circuit module B1 and the second circuit module B2 are circuit boards that are independent of each other.

In another variation embodiment of this application, the first transmission unit 323 and a channel group in a corresponding signal end are configured to transmit low-speed data, and the second transmission unit 325 and a channel group in a corresponding signal end are configured to transmit high-speed data. The low-speed data is a data signal whose data transmission rate is at an Mbps level, for example, a synchronization signal, a field signal, or a reset signal transmitted and processed by using the auxiliary signal. The high-speed data is a data signal whose data transmission rate is at a Gbps level, for example, the image data collected by the photographing module 31.

Figure 4:
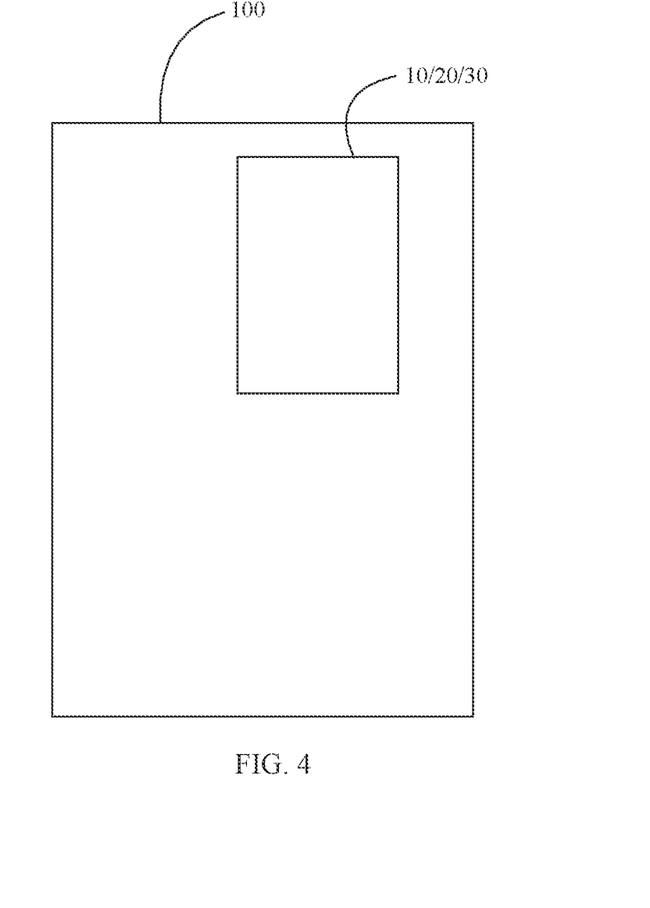
FIG. 4 is a schematic structural diagram of an electronic terminal according to a fourth embodiment of this application.

FIG. 4 is a functional block diagram of an electronic terminal according to a fourth embodiment of the present invention. As shown in FIG. 4, an electronic terminal 100 includes the image capture modules 10 to 30 described in the first to third embodiments and other function modules, such as a sound playback module, a display module, and an operation module. The electronic terminal 100 in this embodiment may be a camera, a remote camera, a mobile phone, a computer, or the like.

The foregoing descriptions are preferred embodiments of the present invention. It should be noted that a person of ordinary skill in the art may make improvements and polishing without departing from the principle of the present invention and the improvements and polishing shall fall within the protection scope of the present invention.

What is claimed is:

1. A device, comprising:
at least one camera configured to collect an image and obtain a first image signal, wherein the first image signal comprises first image data and an auxiliary signal;
a controller configured to:
receive the first image data and the auxiliary signal;
process the first image data based on the auxiliary signal; and
output a control signal; and
a transmitter coupled to the at least one camera and the controller and comprising:
a first signal end comprising a first quantity of connection channels electrically coupled to the at least one camera, wherein the first quantity of connection channels comprises a first channel group and a second channel group, wherein the first channel group is configured to receive and transmit the auxiliary signal and the control signal, wherein the second channel group is configured to receive the first image data, and wherein the first signal end is configured to receive the first image signal; and
a second signal end comprising a second quantity of connection channels electrically connected to the controller, wherein the first quantity is greater than the second quantity, and wherein the second signal end is configured to provide the first image signal or a second image signal derived from the first image signal.

2. The device of claim 1, further comprising:
a first circuit board comprising the transmitter and the at least one camera; and
a second circuit board that is distinct from the first circuit board and that comprises the controller.

3. The device of claim 2, wherein the second image signal comprises time division processed image data or compressed image data, and wherein the transmitter is configured to:
perform time division transmission of the first image signal to derive the time division processed image data; or
perform compression of the first image data to generate the compressed image data.

4. The device of claim 3, wherein the controller comprises:
a third signal end that is electrically connected to the second signal end and that is configured to receive the first image signal or the second image signal from the second signal end;
a transceiver configured to:
perform recovery and synchronization for the time division processed image data to provide the first image data; or
perform decompression of the compressed image data to provide the first image data; and
a data processor configured to receive and process the first image data based on the auxiliary signal.

5. The device of claim 4, wherein the data processor is further configured to transmit the control signal to the at least one camera using the transceiver, the third signal end, and the transmitter to control a working status of the at least one camera.

6. The device of claim 2, wherein the transmitter comprises a first transmitter and a second transmitter, wherein the first transmitter is configured to process and transmit the first image data, second image data derived from the first image data, or both the first image data and the second image data, wherein the second transmitter is configured to process and transmit the auxiliary signal and the control signal, and wherein the control signal is for controlling a working status of the at least one camera.

7. The device of claim 6, wherein the first transmitter is electrically connected to the at least one camera using the first channel group, wherein the first channel group comprises a third quantity of connection channels, wherein the second transmitter is electrically connected to the at least one camera using the second channel group, wherein the second channel group comprises a fifth quantity of connection channels, and wherein a sum of the third quantity and the fifth quantity is equal to the first quantity.

8. The device of claim 7, wherein the second signal end comprises a third channel group that comprises a fourth quantity of connection channels that is less than the second quantity, wherein the third channel group is electrically connected to the first transmitter and the controller, and wherein the first transmitter is configured to:
transmit the auxiliary signal to the controller using the third channel group; and
transmit the control signal to the at least one camera.

9. The device of claim 8, wherein a third signal end of the controller comprises a fifth channel group that comprises a fourth quantity of connection channels, and wherein the fifth channel group and the third channel group are electrically connected in a flat cable or board-to-board connection manner to transmit the auxiliary signal and the control signal.

10. The device of claim 9, wherein the transmitter further comprises a wireless transmitter that is electrically connected to the second transmitter and that is configured to transmit the first image data in a wireless light wave manner or a radio wave manner.

11. The device of claim 10, wherein the wireless transmitter is further configured to transmit a radio broadcast or a radio wave, and wherein the controller comprises:
a transceiver; and
a wireless receiver electrically connected to the transceiver and configured to:
receive the radio broadcast or the radio wave; and
obtain the first image data from the wireless light wave or the radio wave.

12. The device of claim 11,
wherein the transceiver comprises a first transceiver and a second transceiver,
wherein the first transceiver is electrically connected to the fifth channel group and is configured to:
perform recovery and synchronization on second image data derived from the first image data using time division to recover the first image data; or
perform decompression for a compressed version of the auxiliary signal, and
wherein the second transceiver is electrically connected to the wireless receiver and is configured to:
perform recovery and synchronization on the second image data to recover the first image data; or
perform decompression for a compressed version of the first image data.

13. The device of claim 9, wherein the controller further comprises a transceiver that comprises a first transceiver and a second transceiver, wherein the second signal end further comprises a fourth channel group, wherein the third signal end further comprises a sixth channel group that is electrically connected to the fourth channel group in the flat cable or the board-to-board connection manner, wherein the fourth channel group and the sixth channel group comprise a sixth quantity of connection channels,
wherein the first transceiver is electrically connected to the fifth channel group and is configured to:
perform recovery and synchronization for second image data derived from the first image data using time division; or
perform decompression for a compressed version of the auxiliary signal, and
wherein the second transceiver is electrically connected to the sixth channel group and is configured to:
perform recovery and synchronization for the second image data; or
perform decompression for a compressed version of the first image data.

14. The device of claim 13, wherein the first transmitter is configured to perform time division transmission of the auxiliary signal using the third channel group, and the second transmitter is configured to perform time division transmission of the first image data; or wherein the first transmitter is configured to perform compression of the auxiliary signal to reduce a data amount of the first image signal, and the second transmitter is configured to perform compression of the first image data to reduce the data amount.

15. The device of claim 14, wherein the controller further comprises a data processor that is electrically connected to the first transceiver and the second transceiver to receive the data signal and the auxiliary signal, and wherein the data processor is configured to receive and process the first image data based on the auxiliary signal.

16. The device of claim 15, wherein the data processor is configured to process the first image data to generate processed image data, and wherein the data processor is further configured to output the control signal based on a user instruction or based on the processed image data.

17. The device of claim 1, wherein the device further comprises a power cable, and wherein the controller further comprises a power supply circuit that is electrically connected to the at least one camera using the power cable and that is configured to provide a drive voltage to the at least one camera.

18. An electronic terminal, comprising:
an image capture device that comprises:
at least one camera configured to collect an image and obtain a first image signal, wherein the first image signal comprises first image data and an auxiliary signal;
a controller configured to:
receive the first image data and the auxiliary signal;
process the first image data based on the auxiliary signal; and
output a control signal; and
a transmitter coupled to the at least one camera and the controller and comprising:
a first signal end comprising a first quantity of connection channels electrically coupled to the at least one camera, wherein the first quantity of connection channels comprises a first channel group and a second channel group, wherein the first channel group is configured to receive and transmit the auxiliary signal and the control signal, wherein the second channel group is configured to receive the first image data, and wherein the first signal end is configured to receive the first image signal; and
a second signal end comprising a second quantity of connection channels electrically connected to the controller, wherein the first quantity is greater than the second quantity, and wherein the second signal end is configured to provide the first image signal or a second image signal derived from the first image signal.

19. The electronic terminal of claim 18, further comprising:
a first circuit that comprises the transmitter and the at least one camera; and
a second circuit that is distinct from the first circuit and that comprises the controller.

20. The electronic terminal of claim 19, wherein the transmitter comprises a first transmitter and a second transmitter, wherein the first transmitter is configured to process and transmit the first image data, wherein the second transmitter is configured to process and transmit the auxiliary signal and the control signal, and wherein the control signal is for controlling a working status of the at least one camera.

* * * * *

UNITED STATES PATENT AND TRADEMARK OFFICE
CERTIFICATE OF CORRECTION

PATENT NO. : 11,716,544 B2
APPLICATION NO. : 17/599835
DATED : August 1, 2023
INVENTOR(S) : Bo Huang, Peng Zha and Weihua Mao

Page 1 of 1

It is certified that error appears in the above-identified patent and that said Letters Patent is hereby corrected as shown below:

On the Title Page

Page 2, item (56) References Cited, U.S. Patent Documents: "2022/0224830 A1 7/2022 Oku" should read "2022/0224830 A1 7/2022 Okuike"

Signed and Sealed this
Twenty-sixth Day of September, 2023

Katherine Kelly Vidal
*Director of the United States Patent and Trademark Office*